United States Patent
King

(10) Patent No.: US 8,065,832 B2
(45) Date of Patent: Nov. 29, 2011

(54) TREE WATERING SYSTEMS

(76) Inventor: Douglas A. King, Gilbert, AZ (US)

( * ) Notice: Subject to any disclaimer, the term of this patent is extended or adjusted under 35 U.S.C. 154(b) by 956 days.

(21) Appl. No.: 11/766,644

(22) Filed: Jun. 21, 2007

(65) Prior Publication Data

US 2008/0005960 A1    Jan. 10, 2008

Related U.S. Application Data

(60) Provisional application No. 60/805,580, filed on Jun. 22, 2006.

(51) Int. Cl.
*A01G 29/00* (2006.01)

(52) U.S. Cl. .............................. 47/48.5; 47/79

(58) Field of Classification Search .................. 47/48.5, 47/57.5, 79, 80; 111/7.1, 7.2; 43/131; D8/1; 239/276, 273, 271
See application file for complete search history.

(56) References Cited

U.S. PATENT DOCUMENTS

| | | | |
|---|---|---|---|
| 845,953 A * | 3/1907 | Hitchcock | 173/131 |
| 2,214,083 A | 1/1939 | Lester | |
| 2,791,347 A | 11/1954 | Boehm | |
| 2,875,713 A | 1/1955 | Shoffner | |
| 2,776,634 A | 1/1957 | Morton | |
| 2,850,992 A | 9/1958 | Hooper et al. | |
| 3,447,263 A | 6/1969 | Johnson | |
| 3,659,536 A | 5/1972 | White | |
| 3,783,804 A | 1/1974 | Platz | |
| 4,158,269 A | 6/1979 | Williams et al. | |
| 4,207,705 A | 6/1980 | Errede et al. | |
| 4,453,343 A | 6/1984 | Grimes, Sr. | |
| 4,745,706 A | 5/1988 | Muza et al. | |
| 4,999,944 A | 3/1991 | Troy, III et al. | |
| 5,172,515 A | 12/1992 | Lapshansky, Sr. et al. | |
| 5,212,904 A | 5/1993 | Green et al. | |
| 5,279,073 A | 1/1994 | Czebieniak | |
| 5,533,300 A | 7/1996 | Kesler | |
| 5,605,010 A | 2/1997 | Furlong et al. | |
| 5,618,000 A | 4/1997 | Lantzy et al. | |
| D389,705 S | 1/1998 | Puet | |
| 5,761,846 A | 6/1998 | Marz | |
| 5,836,106 A * | 11/1998 | Alex | 47/48.5 |
| 5,901,497 A | 5/1999 | Bulvin | |
| 5,918,412 A | 7/1999 | Shen | |
| 5,924,240 A | 7/1999 | Harrison | |
| 5,996,279 A | 12/1999 | Zayeratabat | |
| D424,894 S | 5/2000 | Pottmeyer | |
| 6,128,856 A | 10/2000 | Doan | |
| 6,138,408 A | 10/2000 | Patemoster et al. | |
| 6,241,163 B1 | 6/2001 | Bremer | |
| 6,243,986 B1 | 6/2001 | Crowley | |
| 6,443,367 B1 | 9/2002 | Bova | |
| 6,540,436 B2 | 4/2003 | Ogi | |
| 6,598,338 B2 | 7/2003 | Buss et al. | |

(Continued)

FOREIGN PATENT DOCUMENTS

AU    2005100386 A4    10/2005

(Continued)

*Primary Examiner* — T. Nguyen
(74) *Attorney, Agent, or Firm* — Stoneman Law Patent Group; Martin L. Stoneman

(57) ABSTRACT

A system for dispersing water to the root zone of one or more trees beneath the soil's surface, comprising a perforated hollow cylindrical tube, ending in a spike, with an internal filter, which is driven into the ground to deliver water to the root zone a tree or trees.

10 Claims, 8 Drawing Sheets

U.S. PATENT DOCUMENTS

| | | |
|---|---|---|
| 2004/0037647 A1 | 2/2004 | Yonat et al. |
| 2005/0000154 A1 | 1/2005 | Perrielo et al. |
| 2005/0163569 A1 | 7/2005 | Allen |
| 2005/0279264 A1 | 12/2005 | Collins |
| 2006/0053690 A1 | 3/2006 | Zayeratabat |
| 2009/0031626 A1 | 2/2009 | Peterson |

FOREIGN PATENT DOCUMENTS

| | | |
|---|---|---|
| JP | 3153088 U9 | 8/2009 |
| KR | 10-0888887 B1 | 3/2009 |

* cited by examiner

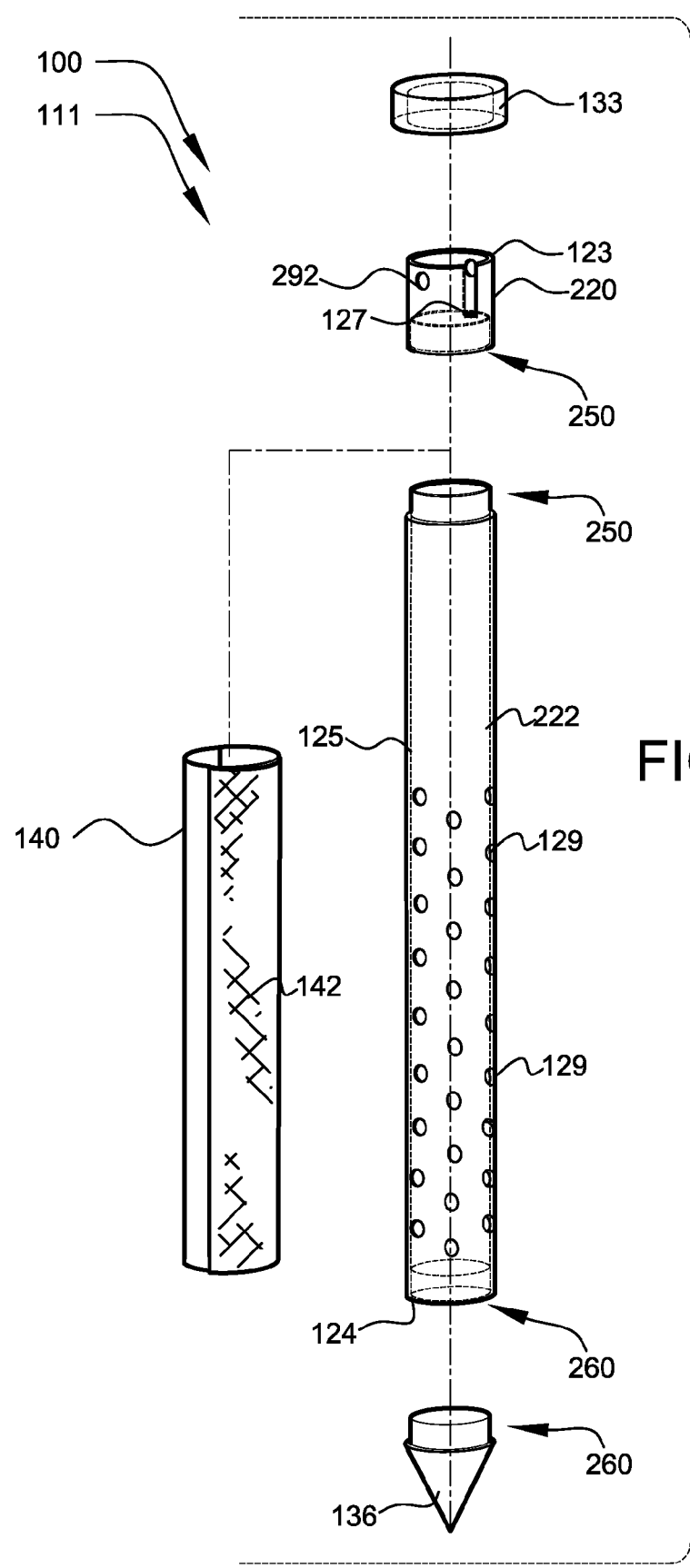

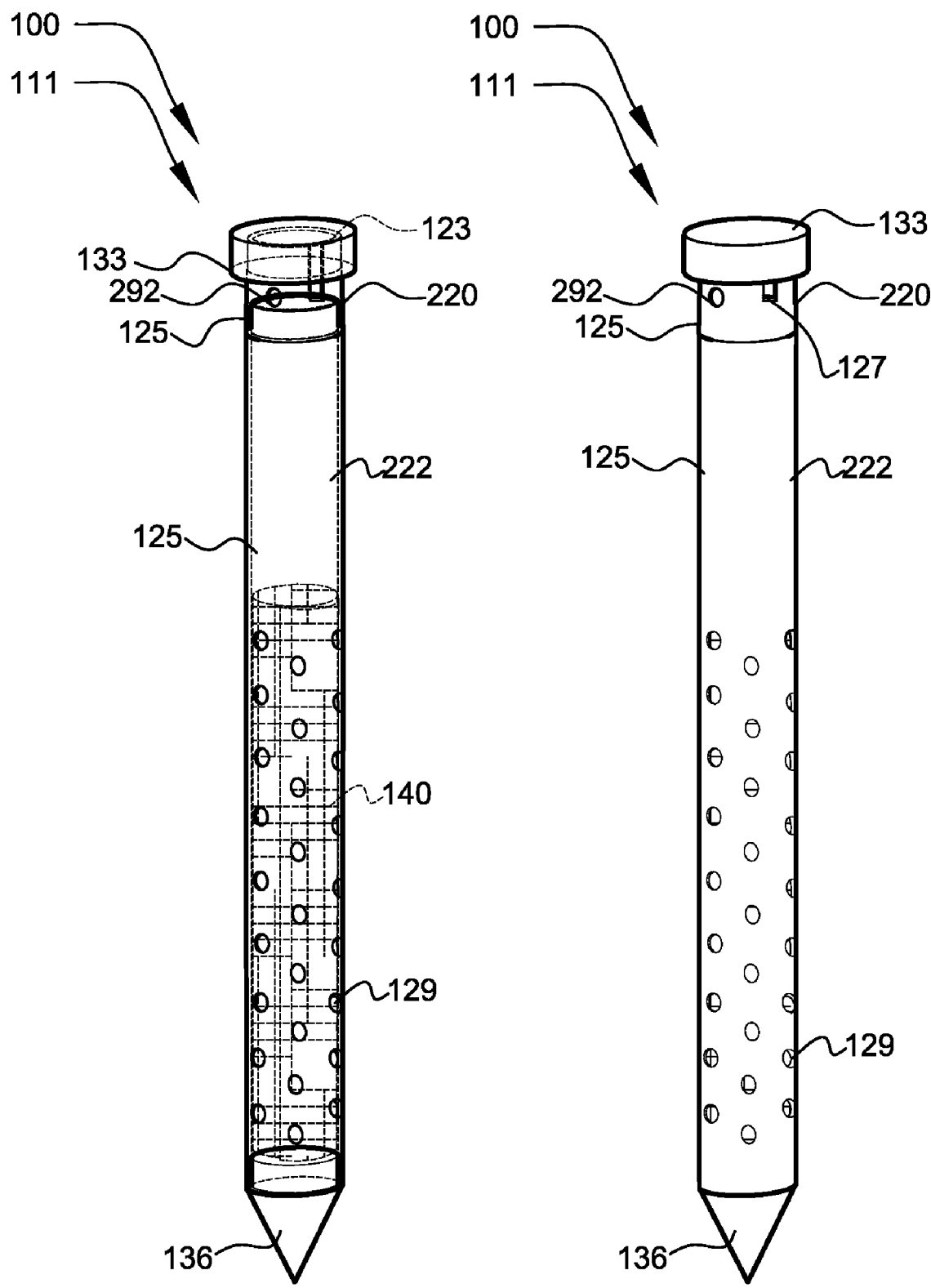

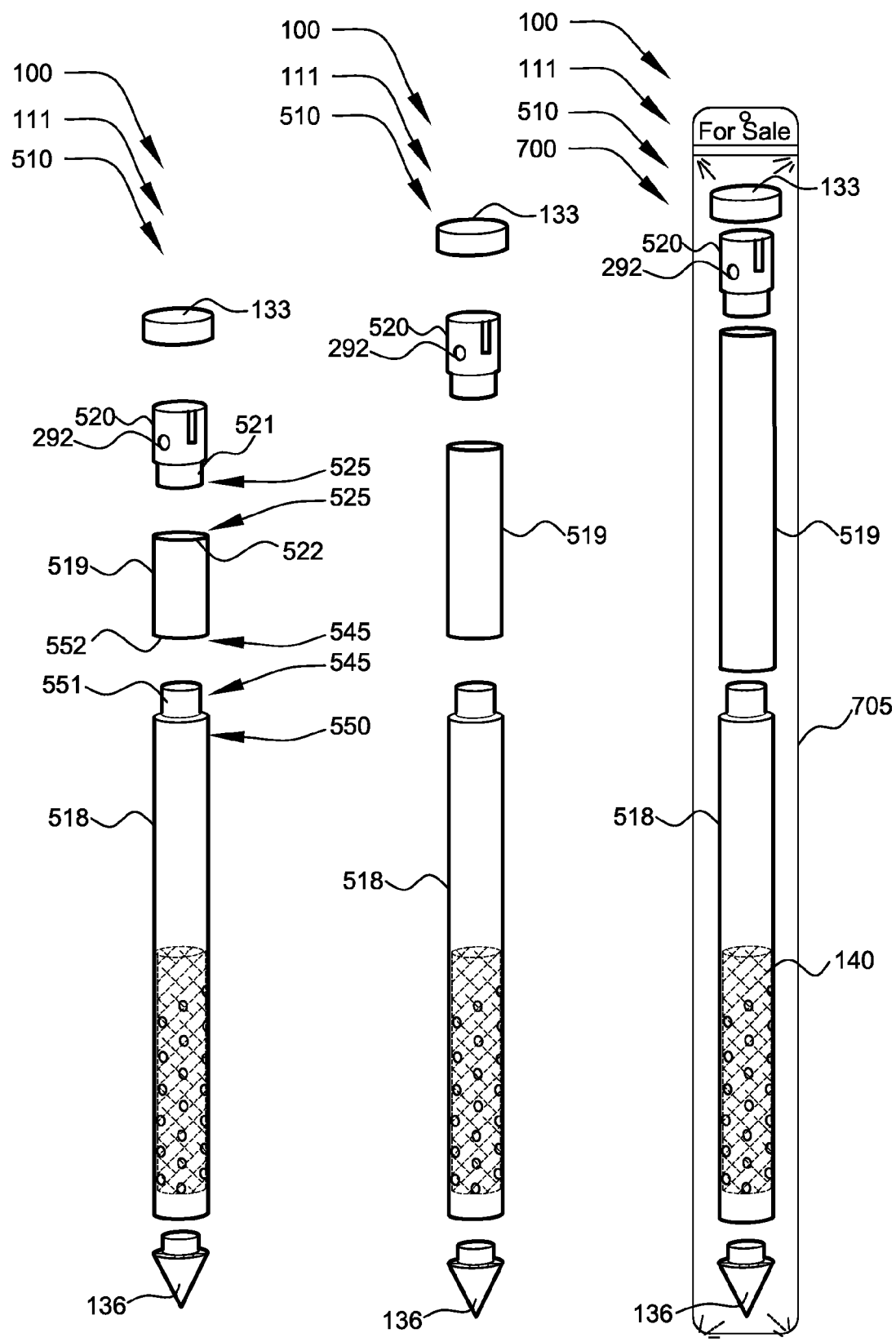

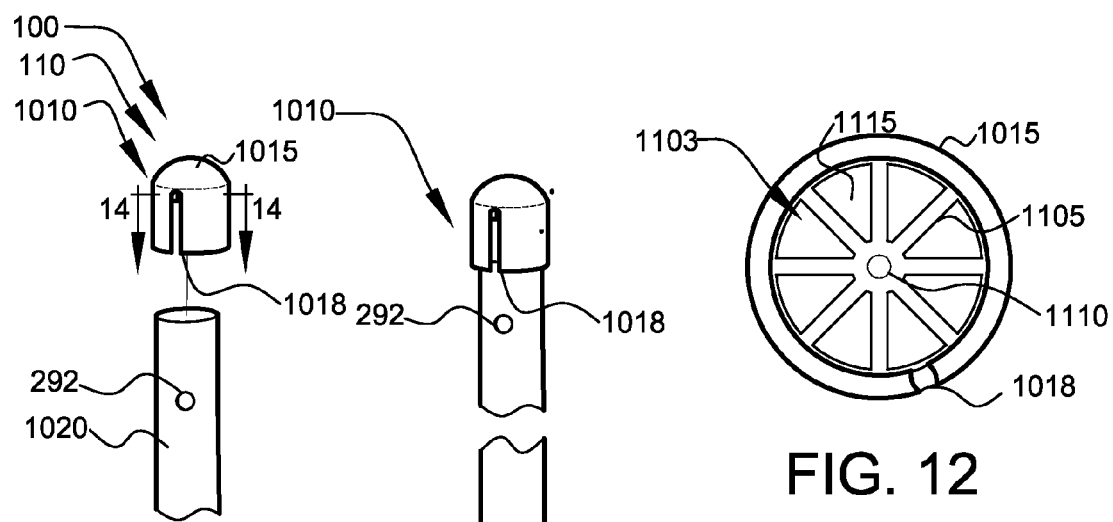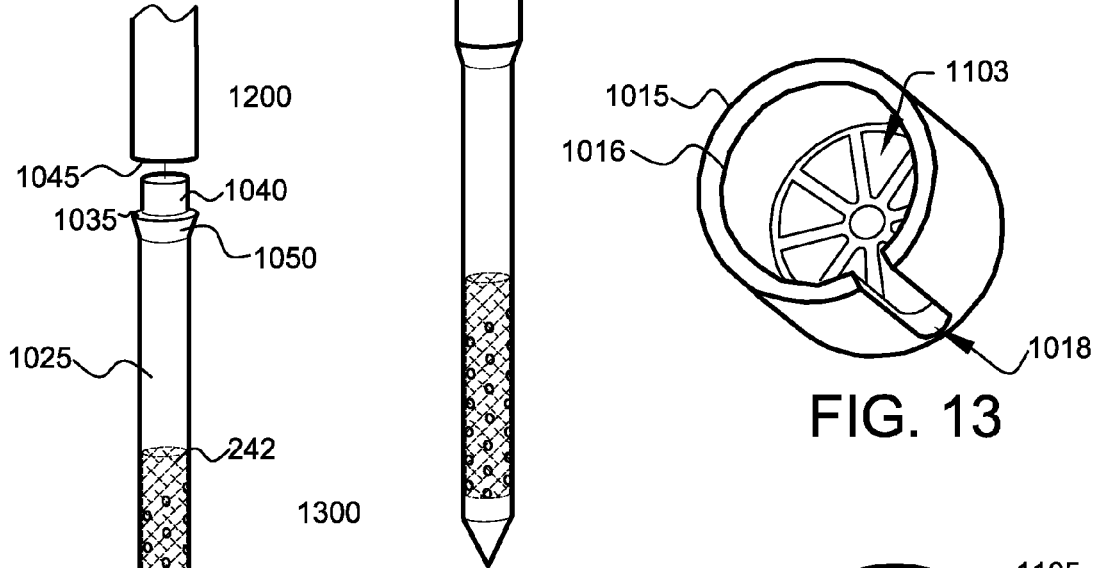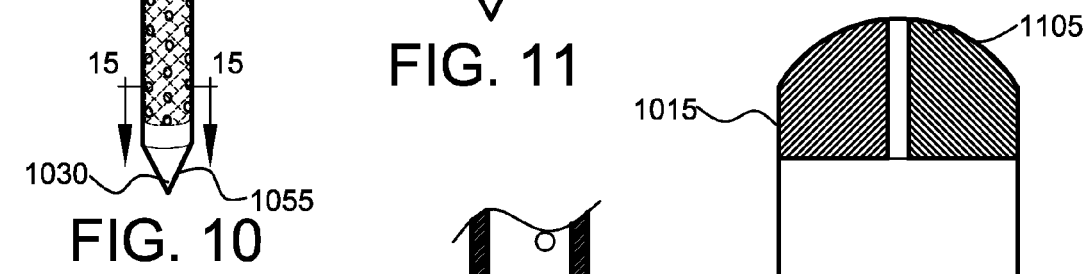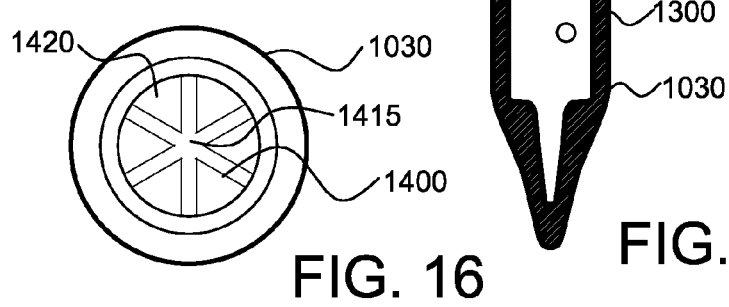

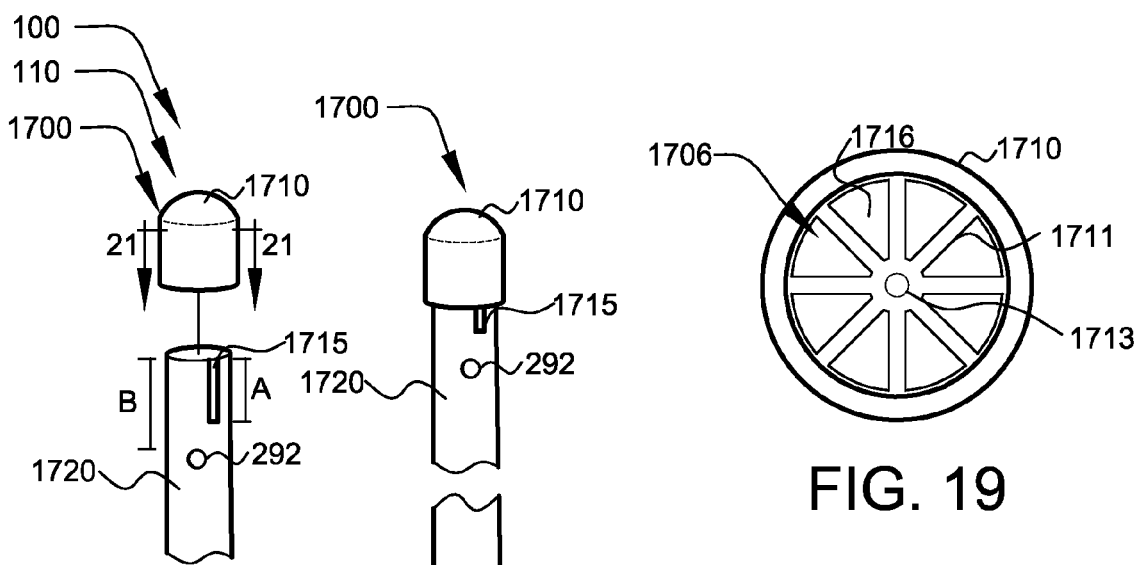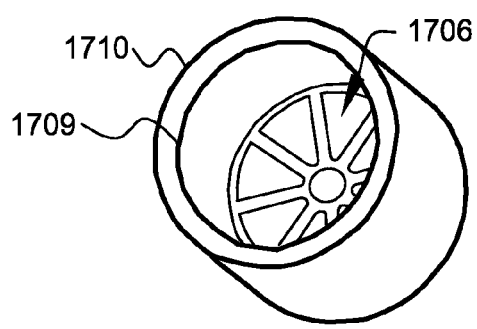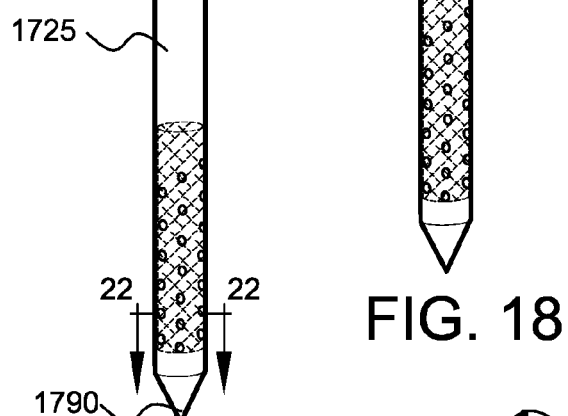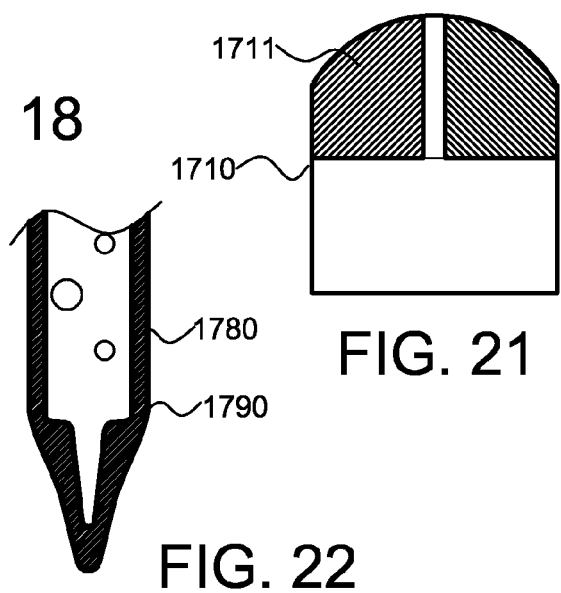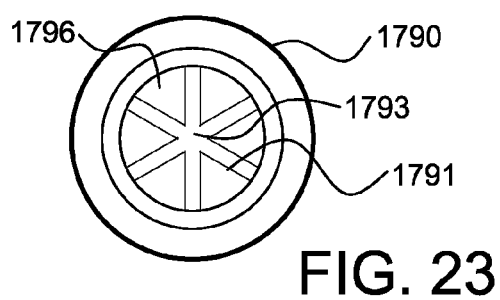

TREE WATERING SYSTEMS

CROSS-REFERENCE TO RELATED APPLICATIONS

The present application is related to and claims priority from prior provisional application Ser. No. 60/805,580, filed Jun. 22, 2006, entitled "TREE WATERING SYSTEMS", the contents of which are incorporated herein by this reference and are not admitted to be prior art with respect to the present invention by the mention in this cross-reference section.

BACKGROUND

The present invention relates to tree watering systems. More particularly, the present invention relates to tree watering systems structured and arranged to deliver water directly to the root zone of a tree. Further, the present invention relates to tree watering systems structured and arranged to be driven into the ground with a hammer or sledgehammer. Also, the present invention relates to tree watering systems structured and arranged to prevent soil from entering the tree watering system. Further, the present invention relates to tree watering systems that are modular to accommodate a range of depths, soil conditions, etc. Also, the present invention relates to tree watering systems structured and arranged to contain an herbicide within the tree watering system to control the growth of the roots of a tree.

No tree watering system exists that can be driven into hard ground deep enough to water trees while preventing dirt from entering the system. Further, no tree watering system exists that is modular in length to accommodate the needs of different trees and soil depths and conditions. Further, no tree watering system exists that further comprises an herbicide to control the growth of the roots of a tree.

Therefore, a need exists for a tree watering system that can be driven into hard ground deep enough to water trees while preventing dirt from entering the system. Further, a need exists for a tree watering system that is modular in length to accommodate the needs of different trees and soils. Further, a need exists for a tree watering system that further comprises an herbicide to control the growth of the roots of a tree

OBJECTS AND FEATURES OF THE INVENTION

A primary object and feature of the present invention is to provide a tree watering system.

It is a further object and feature of the present invention to provide such a system capable of being driven into hard soil with the use of a hammer, sledgehammer, or related device, without cracking or bending such system. It is another object and feature of the present invention to provide such a system having modular lengths. It is yet another object and feature of the present invention to provide such a system structured and arranged to prevent dirt from entering the system. Still another object and feature of the present invention is to provide such a system that further comprises an herbicide to control the growth of the roots of a tree.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a tree watering system, relating to dispersing at least water, from an at least water source, into soil, beneath a surface of such soil, to a root zone of a tree, such tree watering system comprising: at least one cylindrical tube structured and arranged to permit the flow of at least water from the at least water source to the root zone of a tree comprising at least one top end, at least one bottom end, and at least one sidewall; wherein such at least one cylindrical tube is structured and arranged to receive at least water from such at least water source into such at least one cylindrical tube; wherein such at least one cylindrical tube is structured and arranged to disperse at least water through such at least one sidewall of such at least one cylindrical tube; wherein depth placement beneath the soil of such at least one cylindrical tube is selectable; at least one cap structured and arranged to cap such at least one cylindrical tube at such at least one top end; wherein such at least one cap is structurally reinforced to permit pounding such tree watering system into soil without breaking such tree watering system with such at least one cap installed on such at least one top end; at least one spike connected to such at least one cylindrical tube at such at least one bottom end; wherein such at least one spike tapers from such at least one bottom end to exactly one closed conical point; at least one excluder structured and arranged to exclude soil from the interior of such at least one cylindrical tube; wherein such at least one excluder is located adjacent an internal wall of such at least one cylindrical tube. Moreover, it provides such a tree watering system wherein such at least one cylindrical tube comprises a plurality of modularly attachable cylindrical tubes of various sizes to select such depth placement. Additionally, it provides such a tree watering system wherein such at least one spike is removably attachable to such at least one bottom end of such at least one cylindrical tube. Also, it provides such a tree watering system wherein such at least one cylindrical tube comprises at least one slot in such at least one sidewall, adjacent such at least one top end of such at least one cylindrical tube, to receive at least one water source tubing. In addition, it provides such a tree watering system wherein such at least one sidewall comprises at least one hole; wherein such at least one hole is structured and arranged to assist removal of such at least one cylindrical tube from the soil, when installed; and wherein such at least one hole is structured and arranged to be accessible to a user when such at least one top end is substantially adjacent the soil surface. And, it provides such a tree watering system wherein such at least one excluder comprises at least one fabric. Further, it provides such a tree watering system wherein such at least one top end of such at least one cylindrical tube is structured and arranged to be positioned above the soil surface yet below the blades of a lawnmower. Even further, it provides such a tree watering system wherein such at least one top end of such at least one cylindrical tube is adapted to be positioned less than about one inch above the soil surface. Moreover, it provides such a tree watering system further comprising at least one herbicide to control growth of nearby roots. Additionally, it provides such a tree watering system wherein such at least one cylindrical tube comprises a plurality of perforations structured and arranged to assist dispersal of at least water from such at least one cylindrical tube.

In accordance with another preferred embodiment hereof, this invention provides a tree watering system, relating to dispersing at least water, from an at least water source, into soil, beneath a surface of such soil, to a root zone of a tree, such tree watering system comprising: at least one first cylindrical tube structured and arranged to permit the flow of at least water from the at least water source to the root zone of a tree comprising at least one first top end, at least one first bottom end, and at least one first sidewall; at least one second cylindrical tube structured and arranged t to permit the flow of at least water from the at least water source to the root zone of a tree comprising at least one second top end, at least one second bottom end, and at least one second sidewall; wherein such at least one first cylindrical tube and such at least one second cylindrical tube are each structured and arranged to receive at least water from the at least water source; wherein such at least one second cylindrical tube is structured and arranged to disperse at least water through such at least one second sidewall of such at least one second cylindrical tube; wherein depth placement beneath the soil of such at least one cylindrical tube is selectable by selection of a particular second cylindrical tube having a particular length; at least one structurally reinforced cap structured and arranged to cap such at least one first top end and structured and arranged to withstand driving impact forces applied to such tree watering system to drive such tree watering system into the soil; at least one spike connected to such at least one second bottom end of such at least one second cylindrical tube; wherein such at least one spike tapers to exactly one closed conical point; at least one excluder structured and arranged to exclude soil from such at least one tree watering system; wherein such at least one excluder is located inside such at least one second cylindrical tube and adjacent an internal wall of such at least one second cylindrical tube; wherein the length of such at least one second cylindrical tube is at least five times the outside radius of such at least one second cylindrical tube; wherein such at least one first cylindrical tube is structured and arranged to removably connect to such at least one second cylindrical tube. Also, it provides such a tree watering system wherein such at least one taper is removably attachable to such at least one second bottom end of such at least one second cylindrical tube. In addition, it provides such a tree watering system wherein such at least one first sidewall comprises at least one slot adjacent such at least one first top end of such at least one first cylindrical tube to receive at least one water source tubing. And, it provides such a tree watering system, wherein such at least one first cylindrical tube comprises at least one hole structured and arranged to assist removal of such at least one first cylindrical tube from the soil; and wherein such at least one remover comprises at least one hole in such at least one first sidewall structured and arranged to be accessible from adjacent the soil surface in use. Further, it provides such a tree watering system wherein such at least one excluder comprises at least one fabric. Even further, it provides such a tree watering system wherein such at least one first cylindrical tube and such at least one second cylindrical tube are about eighteen inches long when connected together. Moreover, it provides such a tree watering system wherein such at least one first cylindrical tube and such at least one second cylindrical tube are about twenty-four inches long when connected together. Additionally, it provides such a tree watering system wherein such at least one first cylindrical tube and such at least one second cylindrical tube are about thirty-six inches long when connected together. Also, it provides such a tree watering system further comprising at least one herbicide to control growth of nearby roots. In addition, it provides such a tree watering system wherein such at least one cylindrical tube comprises a plurality of perforations structured and arranged to assist dispersal of at least water from such at least one cylindrical tube.

In accordance with another preferred embodiment hereof, this invention provides a tree watering system, relating to dispersing at least water, from an at least water source, into soil, beneath a surface of such soil, to a root zone of a tree, such tree watering system comprising: at least three cylindrical tubes structured and arranged to permit the flow of at least water from the at least water source to the root zone of a tree; wherein a first cylindrical tube of such at least three cylindrical tubes comprises at least one first top end, at least one first male connector, at least one first bottom end, and at least one first sidewall; wherein a second cylindrical tube of such at least three cylindrical tubes comprises at least one second top end, wherein such at least one second top end is structured and arranged to receive such at least one first male connector, at least one second bottom end, and at least one second sidewall, wherein such second cylindrical tube is a particular selectable length; wherein a third cylindrical tube of such at least three cylindrical tubes comprises at least one third top end, wherein such at least one top end comprises at least one second male connector structured and arranged to connect with such at least one second bottom end, at least one third bottom end, and at least one third sidewall; at least one spike connected to such at least one third bottom end; wherein such at least one spike tapers to exactly one closed conical point; wherein such at least three cylindrical tubes are each structured and arranged to receive at least water from the at least water source; wherein such at least one third cylindrical tube is structured and arranged to disperse at least water through such at least one third sidewall of such at least one second cylindrical tube by way of a plurality of perforations in such at least one third sidewall; wherein depth placement beneath the soil of such at least one third cylindrical tube is selectable by selection of a particular second cylindrical tube having a particular length; at least one structurally reinforced cap structured and arranged to cap such at least one first top end and structured and arranged to withstand driving impact forces applied to such tree watering system to drive such tree watering system into the soil; at least one excluder structured and arranged to exclude soil from such at least one tree watering system; wherein such at least one excluder is located inside such at least one second cylindrical tube and adjacent an internal wall of such at least one second cylindrical tube; and wherein the length of such at least one second cylindrical tube is at least five times the outside radius of such at least one second cylindrical tube.

In accordance with a preferred embodiment hereof, this invention provides a tree watering system, relating to dispersing water into soil beneath such soil's surface, comprising: at least one cylindrical tube, comprising at least one top end, at least one bottom end, and at least one sidewall, structured and arranged to contain water; at least one receiver, structured and arranged to receive water into such at least one tube, adjacent such at least one top end of such at least one tube; at least one disperser structured and arranged to disperse water through such at least one sidewall of such at least one tube; at least one depth adjuster structured and arranged to adjust the depth of such at least one disperser beneath the soil surface; at least one reinforcer structured and arranged to reinforce such at least one top end of such at least one tube against driving impact forces; at least one taper structured and arranged to taper such at least one bottom end of such at least one tube into exactly one closed conical point; at least one excluder structured and arranged to exclude soil from such at least one tube; wherein such at least one excluder is located inside such at least one tube and adjacent such at least one disperser; wherein the length of such at least one cylindrical tube is at least five times the outside radius of such at least one cylindrical tube.

Moreover, it provides such a tree watering system, wherein such at least one cylindrical tube comprises a plurality of modularly attachable cylindrical tubes. Additionally, it provides such a tree watering system, wherein such at least one taper is removably attachable to such at least one bottom end of such at least one cylindrical tube. Also, it provides such a tree watering system, wherein such at least one reinforcer comprises at least one cap structured and arranged to cap such at least one top end of such at least one cylindrical tube. In addition, it provides such a tree watering system, wherein such at least one receiver comprises such at least one top end of such at least one cylindrical tube. And, it provides such a tree watering system, wherein such at least one receiver comprises at least one slot through such at least one sidewall adjacent such at least one top end of such at least one cylindrical tube. Further, it provides such a tree watering system, wherein such at least one cylindrical tube comprises at least one remover structured and arranged to assist removal of such at least one cylindrical tube from the soil.

Even further, it provides such a tree watering system, wherein such at least one remover comprises at least one hole in such at least one sidewall structured and arranged to be accessible from adjacent the soil surface in use. Moreover, it provides such a tree watering system, wherein such at least one excluder comprises at least one fabric. Additionally, it provides such a tree watering system, wherein such at least one excluder comprises at least one landscape fabric. Also, it provides such a tree watering system, wherein such at least one cylindrical tube comprises plastic. In addition, it provides such a tree watering system, wherein such at least one cylindrical tube comprises polyvinyl chloride.

And, it provides such a tree watering system, wherein such at least one cylindrical tube comprises at least one outside diameter of about two inches. Further, it provides such a tree watering system, wherein such at least one cylindrical tube is about eighteen inches long. Even further, it provides such a tree watering system, wherein such at least one cylindrical tube is about twenty-four inches long. Moreover, it provides such a tree watering system, wherein such at least one cylindrical tube is about thirty-six inches long. Additionally, it provides such a tree watering system, wherein such at least one top end of such at least one cylindrical tube is structured and arranged to be positioned above the soil surface and below the blades of a lawnmower. Also, it provides such a tree watering system, wherein such at least one top end of such at least one cylindrical tube is structured and arranged to be positioned about one inch above the soil surface.

In accordance with another preferred embodiment hereof, this invention provides a tree watering system, relating to dispersing water into soil beneath such soil's surface, comprising: at least one first cylindrical tube, comprising at least one first top end, at least one first bottom end, and at least one first sidewall, structured and arranged to contain water; at least one second cylindrical tube, comprising at least one second top end, at least one second bottom end, and at least one second sidewall, structured and arranged to contain water; at least one receiver, structured and arranged to receive water into such at least one first cylindrical tube, adjacent such at least one first top end; at least one disperser structured and arranged to disperse water through such at least one second sidewall of such at least one second cylindrical tube; at least one depth adjuster structured and arranged to adjust the depth of such at least one second cylindrical tube beneath the soil surface; at least one reinforcer structured and arranged to reinforce such at least one first top end of such at least one first tube against driving impact forces; at least one taper structured and arranged to taper such at least one second bottom end of such at least one second cylindrical tube into exactly one closed conical point; and at least one excluder structured and arranged to exclude soil from such at least one second cylindrical tube; wherein such at least one excluder is located inside such at least one second cylindrical tube and adjacent such at least one disperser; wherein the length of such at least one second cylindrical tube is at least five times the outside radius of such at least one second cylindrical tube; wherein such at least one first cylindrical tube is structured and arranged to removably connect to such at least one second cylindrical tube. In addition, it provides such a tree watering system, wherein such at least one second cylindrical tube comprises at least one connector structured and arranged to connect such at least one second top end to such at least one second bottom end.

And, it provides such a tree watering system, wherein such at least one taper is removably attachable to such at least one second bottom end of such at least one second cylindrical tube. Further, it provides such a tree watering system, wherein such at least one reinforcer comprises at least one cap structured and arranged to cap such at least one first top end of such at least one first cylindrical tube. Even further, it provides such a tree watering system, wherein such at least one receiver comprises such at least one first top end of such at least one first cylindrical tube. Moreover, it provides such a tree watering system, wherein such at least one receiver comprises at least one slot through such at least one first sidewall adjacent such at least one first top end of such at least one first cylindrical tube.

Additionally, it provides such a tree watering system, wherein such at least one first cylindrical tube comprises at least one remover structured and arranged to assist removal of such at least one first cylindrical tube from the soil. Also, it provides such a tree watering system, wherein such at least one remover comprises at least one hole in such at least one first sidewall structured and arranged to be accessible from adjacent the soil surface in use. In addition, it provides such a tree watering system, wherein such at least one excluder comprises at least one fabric. And, it provides such a tree watering system, wherein such at least one excluder comprises at least one landscape fabric. Further, it provides such a tree watering system, wherein such at least one second cylindrical tube comprises plastic. Even further, it provides such a tree watering system, wherein such at least one second cylindrical tube comprises polyvinyl chloride.

Moreover, it provides such a tree watering system, wherein such at least one second cylindrical tube comprises at least one outside diameter of about two inches. Additionally, it provides such a tree watering system, wherein such at least one first cylindrical tube and such at least one second cylindrical tube are about eighteen inches long when connected together. Also, it provides such a tree watering system, wherein such at least one first cylindrical tube and such at least one second cylindrical tube are about twenty-four inches long when connected together. In addition, it provides such a tree watering system, wherein such at least one first cylindrical tube and such at least one second cylindrical tube are about thirty-six inches long when connected together.

And, it provides such a tree watering system, wherein such at least one first top end of such at least one first cylindrical tube is structured and arranged to be positioned above the soil surface and below the blades of a lawnmower. Further, it provides such a tree watering system, wherein such at least one first top end of such at least one first cylindrical tube is structured and arranged to be positioned about one inch above the soil surface.

In accordance with another preferred embodiment hereof, this invention provides a tree watering kit, relating to dispersing water into soil beneath such soil's surface, comprising: at least one first cylindrical tube, comprising at least one first top end, at least one first bottom end, and at least one first sidewall, structured and arranged to contain water, wherein such at least one first cylindrical tube comprises at least one receiver, structured and arranged to receive water into such at least one first cylindrical tube, adjacent such at least one first top end; at least one depth adjuster structured and arranged to adjust the depth of such at least one second cylindrical tube beneath the soil surface; and at least one reinforcer structured and arranged to reinforce such at least one first top end of such at least one first tube against driving impact forces; at least one second cylindrical tube, comprising at least one second top end, at least one second bottom end, and at least one second sidewall, structured and arranged to contain water, wherein such at least one second cylindrical tube comprises at least one disperser structured and arranged to disperse water through such at least one second sidewall of such at least one second cylindrical tube; wherein the length of such at least one second cylindrical tube is at least five times the outside radius of such at least one second cylindrical tube; at least one taper structured and arranged to taper such at least one second bottom end of such at least one second cylindrical tube into exactly one closed conical point; and wherein such at least one first bottom end of such at least one first cylindrical tube is structured and arranged to removably connect to such at least one second top end of such at least one second cylindrical tube; at least one excluder structured and arranged to exclude soil from such at least one second cylindrical tube; wherein such at least one excluder is structured and arranged to be located inside such at least one second cylindrical tube and adjacent such at least one disperser; and at least one packaging structured and arranged to package such at least one first cylindrical tube, such at least one second cylindrical tube, and such at least one excluder for sale.

Even further, it provides such a tree watering kit, wherein such at least one taper is removably attachable to such at least one second bottom end of such at least one second cylindrical tube. Even further, it provides such a tree watering kit, wherein such at least one reinforcer comprises at least one cap structured and arranged to cap such at least one first top end of such at least one first cylindrical tube.

Even further, it provides such a tree watering system, wherein such at least one first cylindrical tube and such at least one second cylindrical tube are about eighteen inches long when connected together. Even further, it provides such a tree watering system, wherein such at least first cylindrical tube and such at least one second cylindrical tube are about twenty-four inches long when connected together. Even further, it provides such a tree watering system, wherein such at least one first cylindrical tube and such at least one second cylindrical tube are about thirty-six inches long when connected together.

In accordance with another preferred embodiment hereof, this invention provides a tree watering system, comprising: injector means for injecting water into the soil, wherein such injector means comprises tube means for containing water; receiver means for receiving water into such tube means; and disperser means for dispersing water from such tube means; soil displacer means for displacing the soil, wherein such soil displacer means comprises reinforcer means for reinforcing such injector means against impact forces adjacent such receiver means; shaper means for shaping such tube means into at least one right cylinder; and taper means for tapering such linear extender means into exactly one conical point; and excluder means for excluding soil from such tube means; wherein such excluder means is located inside such tube means and adjacent such disperser means; and wherein such injector means comprises such soil displacer means.

Even further, it provides such a tree watering system, comprising each and every novel feature, element, combination, step and/or method disclosed or suggested herein.

BRIEF DESCRIPTION OF THE DRAWINGS

FIG. 2 shows an exploded perspective view illustrating a tree watering system according to a preferred embodiment of the present invention.

FIG. 3 shows a perspective view, illustrating the tree watering system according to the preferred embodiment of FIG. 2, assembled with hidden details shown.

FIG. 4 shows a perspective view illustrating the tree watering system of FIG. 2 assembled.

FIG. 5 shows an exploded perspective view illustrating a tree watering system, comprising a center shaft having a first length, according to a preferred embodiment of the present invention.

FIG. 6 shows an exploded perspective view illustrating the tree watering system according to the preferred embodiment of FIG. 5, showing a second length of the center shaft.

FIG. 7 shows an exploded perspective view illustrating the tree watering system according to the preferred embodiment of FIG. 5, showing a third length of the center shaft and showing a kit according to a preferred embodiment of the present invention.

FIG. 10 an exploded perspective view illustrating a tree watering system according to another preferred embodiment of the present invention.

FIG. 11 shows a perspective view illustrating the tree watering system of FIG. 10 in an assembled configuration.

FIG. 12 shows a plan view of the underside of a cap of the tree watering system of FIG. 10.

FIG. 13 shows a perspective view of the cap of FIG. 12.

FIG. 14 shows a cross-sectional view of the section 14-14 illustrating the cap of the tree watering system of FIG. 10.

FIG. 15 shows a cross-sectional view through the section 15-15 illustrating the reinforced spike of the tree watering system of FIG. 10.

FIG. 16 shows a plan view illustrating an alternate embodiment of a reinforced spike of the tree watering system of FIG. 10.

FIG. 17 shows an exploded perspective view illustrating a tree watering system according to yet another preferred embodiment of the present invention.

FIG. 18 shows a perspective view illustrating the tree watering system of FIG. 17 in an assembled configuration.

FIG. 19 shows a plan view of the underside of a cap of the tree watering system of FIG. 17.

FIG. 20 shows a perspective view of the cap of FIG. 19.

FIG. 21 shows a cross-sectional view of the cap of the tree watering system of FIG. 17 through the section 21-21.

FIG. 22 shows a cross-sectional view of the section 22-22 illustrating the reinforced spike of the tree watering system of FIG. 17.

FIG. 23 shows a top plan view illustrating an alternate embodiment of the reinforced spike of the tree watering system of FIG. 17.

DETAILED DESCRIPTION OF THE BEST MODES AND PREFERRED EMBODIMENTS OF THE INVENTION

Figure 1:
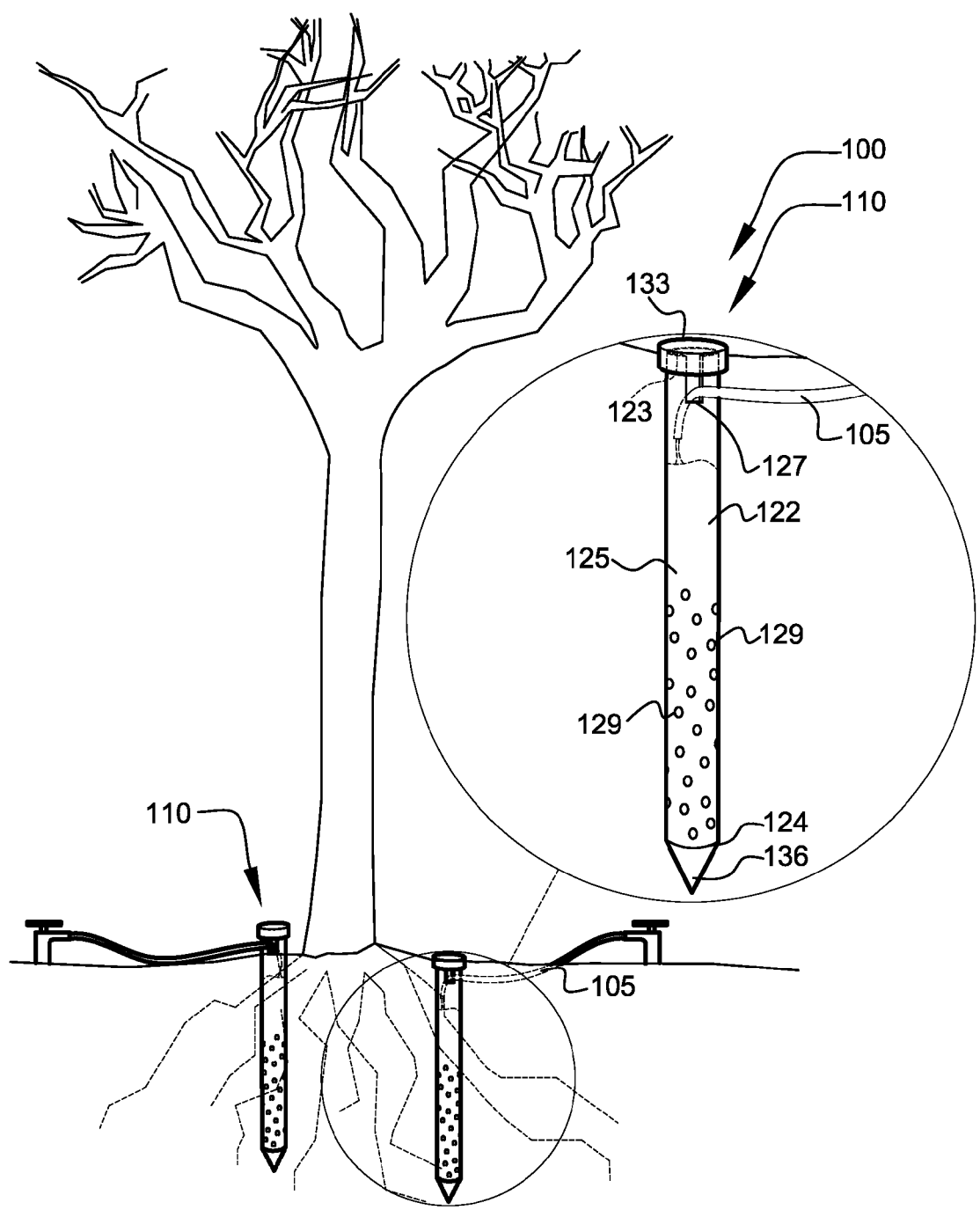
FIG. 1 shows a front view illustrating the use of a tree watering system according to a preferred embodiment of the present invention and an enlarged perspective view of a tree waterer of the tree watering system according to a preferred embodiment of the present invention.

FIG. 1 shows a front view illustrating the use of a tree watering system according to a preferred embodiment of the present invention and an enlarged perspective view of a tree waterer of the tree watering system according to a preferred embodiment of the present invention. Preferably, tree watering system 100 comprises tree waterer 110, as shown. FIG. 1 shows two of tree waterer 110 driven into the ground, or soil surface, near a tree. Preferably, tree waterer 110 is driven into the ground to deliver water, or at least water, such as a water/nutrient mix, to the root zone of a tree, as shown. Preferably, tree waterer 110 is driven into the ground with a sledgehammer, hammer, or related device.

Preferably, tree waterer 110 comprises at least the following: tube 122, spike 136 (which is tapered and closes to a closed conical point, as shown), cap 133, and fabric 142, or excluder, (see FIGS. 2 and 3), as shown. As tree waterer 110 is driven into a soil surface, spike 136 and tube 122 displace the punctured soil so that tree waterer 110 will be inserted firmly within the soil surface. After such insertion, the tree waterer 110 will remain in place indefinitely. Upon reading the teachings of this specification, those with ordinary skill in the art will now understand that, under appropriate circumstances, considering such issues as advances in technology, user preference, etc., other installation methods, such as burying the spike (displacer) when a tree is planted, digging a hole to install the spike adjacent an established tree, etc., may suffice.

Preferably, tube 122 comprises a hollow cylinder, as shown. Preferably, tube 122 comprises top end 123, bottom end 124, and sidewall 125, as shown (at least embodying herein at least one cylindrical tube comprising at least one top end, at least one bottom end, and at least one sidewall, structured and arranged to contain water and at least embodying herein at least one cylindrical tube structured and arranged to permit the flow of at least water from the at least water source to the root zone of a tree comprising at least one top end, at least one bottom end, and at least one sidewall; wherein such at least one cylindrical tube is structured and arranged to receive at least water from such at least water source into such at least one cylindrical tube; wherein such at least one cylindrical tube is structured and arranged to disperse at least water through such at least one sidewall of such at least one cylindrical tube; wherein depth placement beneath the soil of such at least one cylindrical tube is selectable; at least one cap structured and arranged to cap such at least one cylindrical tube at such at least one top end; wherein such at least one cap is structurally reinforced to permit pounding such tree watering system into soil without breaking such tree watering system with such at least one cap installed on such at least one top end; at least one spike connected to such at least one cylindrical tube at such at least one bottom end; wherein such at least one spike tapers from such at least one bottom end to exactly one closed conical point; at least one excluder structured and arranged to exclude soil from the interior of such at least one cylindrical tube; wherein such at least one excluder is located adjacent an internal wall of such at least one cylindrical tube).

Preferably, in a preferred embodiment, sidewall 125 comprises slot 127 which is preferably cut into sidewall 125 adjacent top end 123, as shown (at least embodying herein wherein such at least one receiver comprises at least one slot through such at least one sidewall adjacent such at least one top end of such at least one cylindrical tube). Slot 127 preferably receives water source tubing, as shown, for example, in FIG. 1. Top end 123, is preferably open, as shown (at least embodying herein wherein such at least one receiver comprises such at least one top end of such at least one cylindrical tube). Preferably, the combination of the open top end 123 and slot 127 permits the introduction of (at least embodying herein at least one receiver, structured and arranged to receive water into such at least one tube, adjacent such at least one top end of such at least one tube) at least one drip irrigation line 105 into the hollow tube 122 of tree waterer 110, as shown. Such placement of a drip irrigation line provides for the introduction of water, or other fluids (nutrient/water mixtures), into tree waterer 110 which will be distributed to the roots of a tree, as shown. Upon reading the teachings of this specification, those with ordinary skill in the art will now understand that, under appropriate circumstances, considering such issues as advances in technology, user preference, etc., other receivers, such as emitter ports, hose connections, sprinkler pipe attachments, etc., may suffice.

Preferably, the embodiment in FIG. 1 may be driven into the ground a sufficient distance so that cap 133 and slot 127 are above a soil surface, as shown. Preferably, a lawnmower, or other gardening maintenance device, may be driven over installed tree water 110 without risking breakage of tree waterer 110, especially cap 133.

Preferably, tube 122 comprises durable material, preferably plastic (at least embodying herein wherein such at least one cylindrical tube comprises plastic). Most preferably, tube 122 comprises polyvinyl chloride (PVC) plastic (at least embodying herein wherein such at least one cylindrical tube comprises polyvinyl chloride). Preferably, tube 122 comprises PVC pipe. Preferably, tube 122 comprises Schedule 80 PVC pipe. Preferably, such PVC plastic is tinted to resist damage from ultraviolet light. Preferably, PVC plastic comprises at least a tan pigment. Preferably, at least the cap 133 comprises a tan pigment.

Preferably, sidewalls 125 are between about one-tenth inch and about three-tenths inches thick. Preferably, the length of tube 122 is at least five times the outside radius of tube 122, as shown (at least embodying herein wherein the length of such at least one cylindrical tube is at least five times the outside radius of such at least one cylindrical tube). Preferably, tube 122 is about eighteen inches long (at least embodying herein wherein such at least one cylindrical tube is about eighteen inches long). Preferably, tube 122 is about twenty-four inches long (at least embodying herein wherein such at least one cylindrical tube is about twenty-four inches long). Preferably, tube 122 is about thirty-six inches long (at least embodying herein wherein such at least one cylindrical tube is about thirty-six inches long). Upon reading the teachings of this specification, those with ordinary skill in the art will now understand that, under appropriate circumstances, considering such issues as advances in technology, user preference, etc., other tube materials, such as metal, ceramic, fiberglass, etc., may suffice.

Preferably, tube 122 permits water to flow out of tube 122 at a selected depth and into the surrounding soil. Preferably, tube 122 (at least embodying herein at least one disperser structured and arranged to disperse water through such at least one sidewall of such at least one tube) comprises a plurality of perforations 129 through sidewall 125, as shown. Preferably, perforations 129 are between about one-sixteenth inch and about one-inch in diameter. More preferably, perforations 129 are between about one-quarter inch and about one-half inch in diameter. Preferably, perforations 129 are arrayed across tube 122 in a pattern structured and arranged to evenly distribute water around the circumference of tube 122, as shown. Preferably, perforations 129 are arrayed across tube 122 in a pattern structured and arranged to maintain the physical strength and integrity of tube 122 such that tube 122 is able to physically withstand being driven into the ground, as shown. Preferably, perforations 129 are arrayed in parallel lines along the length of tube 122 so that strong, uninterrupted material remains between each line of perforations 129, as shown. Upon reading the teachings of this specification, those with ordinary skill in the art will now understand that, under appropriate circumstances, considering such issues as advances in technology, user preference, etc., other dispersers, such as permeable-material portions of the tube, other perforation patterns, etc., may suffice.

Preferably, spike 136 taper to a conical point and is structured and arranged to puncture and displace soil, as shown.

Preferably, cap 133 reinforces tree waterer 110 against the force of impact used to drive tree waterer 110 into the ground, preferably against the force of a sledgehammer strike. Preferably, cap 133 covers top end 123, as shown. Preferably, cap 133 fits onto top end securely so that top end 123 does not get splayed out during hammering. Preferably, cap 133 comprises durable material, preferably plastic, most preferably polyvinyl chloride plastic (PVC). Preferably, cap 133 (at least embodying herein at least one reinforcer structured and arranged to reinforce such at least one top end of such at least one tube against driving impact forces) comprises a PVC pipe end-cap. Upon reading the teachings of this specification, those with ordinary skill in the art will now understand that, under appropriate circumstances, considering such issues as advances in technology, user preference, etc., other reinforcers, such as a strong closed top end, a driving tool that covers the top end while the tree waterer is pressed into the soil, a solid insert that fills the tree waterer while the tree waterer is hammerer into the soil, etc., may suffice.

Preferably, tube 122 comprises a substantially smooth-sided right cylinder, as shown. Preferably, tube 122 comprises a round hollow tube, as shown. Preventing changes in radius and shape along the length of tube 122 makes it much easier to drive tree waterer 110 into the ground. Upon reading the teachings of this specification, those with ordinary skill in the art will now understand that, under appropriate circumstances, considering such issues as advances in technology, user preference, etc., other tube shapes, such as screw-shaped, longitudinally ridged, etc., may suffice.

Preferably, spike 136 extends from bottom end 124 of tube 122, as shown. Preferably, spike 136 assists in pushing ground, or soil, aside as tree waterer 110 is driven into the ground. Preferably, spike 136 ends in a conical point, as shown. Preferably, for durability, spike 136 is solid and not completely hollow, as shown in FIG. 2. Preferably, spike 136 comprises durable material, preferably plastic, most preferably PVC plastic. Preferably, spike 136 is flush with tube 122 at bottom end 124, as shown, so that tree waterer 110 moves smoothly through the soil. Preferably, spike 136 (at least embodying herein at least one taper structured and arranged to taper such at least one bottom end of such at least one tube into exactly one closed conical point) is at least about twice as long as it's diameter, as shown. Upon reading the teachings of this specification, those with ordinary skill in the art will now understand that, under appropriate circumstances, considering such issues as advances in technology, user preference, etc., other taper designs, such as a wedge, a pyramid, a graduated taper, the taper being part of the disperser, etc., may suffice.

Preferably, internal filter 140 excludes, or prevents, soil and related particles from entering tube 122 through perforations 129 while permitting water to flow into the soil from perforations 129. Preferably, internal filter 140 is placed within tube 122 adjacent the interior of sidewall 125, as shown (at least embodying herein wherein such at least one excluder is located inside such at least one tube and adjacent such at least one disperser; and at least embodying herein wherein such excluder means is located inside such tube means and adjacent such disperser means). Internal filter 140 (at least embodying herein at least one excluder structured and arranged to exclude soil from such at least one tube; and at least embodying herein excluder means for excluding soil from such tube means) is further described with respect to FIG. 2.

Preferably, tree waterer 110 is driven almost entirely into the ground with a sledgehammer, hammer, etc., and then water is poured or otherwise introduced into tree waterer 110 through top end 123 and slot 127, as shown. Preferably, the water percolates out of tree waterer 110 directly into the root zone of the tree, as shown. Preferably, tree waterer 110 is left in place indefinitely. Preferably, tree waterer 110 is left in place indefinitely to receive water provided by a drip irrigation system, as shown. Preferably, one or more of tree waterer 110 are used per tree, depending on the size of the tree, preferably one tree waterer 110 is used per drip system emitter, as shown.

Preferably, tree watering system 100 is driven into the ground deep enough to place perforations 129 at a desired depth, as shown. Preferably, tree watering system 100 is driven into the ground nearly to top end 123, as shown. More preferably, tree watering system 100 is driven into the ground deeply enough that top end 123 (and/or cap 133) are below the level of lawnmower blades (at least embodying herein wherein such at least one top end of such at least one cylindrical tube is structured and arranged to be positioned above the soil surface and below the blades of a lawnmower). Most preferably, tree watering system 100 is driven into the ground deeply enough that top end 123 (and/or cap 133) are less than about one inch above the soil surface (at least embodying herein wherein such at least one top end of such at least one cylindrical tube is structured and arranged to be positioned less than about one inch above the soil surface).

FIG. 2 shows an exploded perspective view illustrating a tree watering system according to a preferred embodiment of the present invention. Preferably, tree watering system 100 comprises tree waterer 111, as shown. Preferably, tree waterer 111 comprises cap 133, spike 136, internal filter 140, as shown. Preferably, in the embodiment of FIG. 2, two tubular segments are preferred (instead of a single tube 122 as shown in FIG. 1), namely top tube 220 and bottom tube 222, as shown. Preferably, internal filter 140 comprises fabric 142, as shown. Preferably, fabric 142 (at least embodying herein wherein such at least one excluder comprises at least one fabric) is rolled into a tube having about the same diameter as the internal diameter of bottom tube 222, as shown. Preferably, the resulting tube of fabric 142 is inserted into bottom tube 222 such that internal filter 140 presses against the internal sidewall of bottom tube 222 and perforations 129, as shown. Preferably, internal filter 142 prevents soil particles from entering bottom tube 222 through perforations 129. Most preferably, internal filter 142 comprises at least one landscape fabric, preferably at least one airlaid polymer fabric (at least embodying herein wherein such at least one excluder comprises at least one landscape fabric). Upon reading the teachings of this specification, those with ordinary skill in the art will now understand that, under appropriate circumstances, considering such issues as advances in technology, user preference, etc., other excluders, such as permeable-material portions of the tube, a cylindrical porous insert into the tube instead of a tube of fabric, etc., may suffice.

Preferably, top tube 220 and bottom tube 222 connect together with an outside flush joint (where the outside diameter of the cylinder is substantially unchanged across the joint), as shown (at least embodying herein wherein such at least one first cylindrical tube is structured and arranged to removably connect to such at least one second cylindrical tube). Preferably, top tube 220 and bottom tube 222 connect together with unthreaded flush joint 250, as shown. The length of watering system 100, and specifically of tree waterer 111 when top tube 220 is connected to bottom tube 222, is preferably variable to accommodate various applications. Preferably, top tube 220 and bottom tube 222 are at least 18 inches long when they are attached together. Preferably, top tube 220 (at least embodying herein at least one first cylindrical tube comprising at least one first top end, at least one first bottom end, and at least one first sidewall, structured and arranged to contain water) and bottom tube 222 (at least embodying herein at least one second cylindrical tube comprising at least one second top end, at least one second bottom end, and at least one second sidewall, structured and arranged to contain water) are at least 24 inches long when they are attached together. Preferably, top tube 220 and bottom tube 222 (at least embodying herein at least one depth adjuster structured and arranged to adjust the depth of such at least one second cylindrical tube beneath the soil surface) are at least 36 inches long when they are attached together. Preferably, the length is selected to meet the needs of the tree being watered and the permeability of the soil. Larger trees will typically need longer tree watering systems 100 than smaller trees. Compacted soils will typically need longer tree watering systems 100 than porous soils use. Upon reading the teachings of this specification, those with ordinary skill in the art will now understand that, under appropriate circumstances, considering such issues as advances in technology, user preference, etc., other sizes, such as one foot long, five feet long, etc., may suffice.

Preferably, top tube 220 and bottom tube 222 are at least about one inch in outside diameter. More preferably, top tube 220 and bottom tube 222 are at least about two inches in outside diameter (at least embodying herein wherein such at least one cylindrical tube comprises at least one outside diameter of about two inches). Preferably, bottom tube 222 is at least about five times longer than the outside diameter of bottom tube 222, as shown (at least embodying herein wherein the length of such at least one second cylindrical tube is at least five times the outside radius of such at least one second cylindrical tube). Upon reading the teachings of this specification, those with ordinary skill in the art will now understand that, under appropriate circumstances, considering such issues as advances in technology, user preference, etc., other diameters, such as four inches, six inches, etc., may suffice.

Preferably, cap 133 fits over top end 123 of top tube 220, as shown. Preferably, cap 133 reinforces top end 123 while tree waterer 110 is being driven into the ground (at least embodying herein at least one reinforcer structured and arranged to reinforce such at least one first top end of such at least one first tube against driving impact forces). Preferably, cap 133 (at least embodying herein wherein such at least one reinforcer comprises at least one cap structured and arranged to cap such at least one top end of such at least one cylindrical tube) remains over top end 123 in use, as shown in FIG. 1, in order to help prevent debris from dropping into tube 122.

Preferably, spike 136 tapers from a point located on the outside diameter of bottom tube 222, as shown. Preferably, spike 136 (at least embodying herein at least one taper structured and arranged to taper such at least one second bottom end of such at least one second cylindrical tube into exactly one closed conical point) and bottom tube 222 connect together with an outside flush joint, as shown. Preferably, spike 136 and bottom tube 222 connect together with unthreaded flush joint 260, as shown (at least embodying herein wherein such at least one taper is removably attachable to such at least one bottom end of such at least one cylindrical tube). Upon reading the teachings of this specification, those with ordinary skill in the art will now understand that, under appropriate circumstances, considering such issues as advances in technology, user preference, etc., other flush joints, such as threaded flush joints, glued butt joints, interlocking flush joints, etc., may suffice.

Preferably, perforations 129 are evenly distributed around the circumference of tube 122, as shown. Preferably, perforations 129 (at least embodying herein at least one disperser structured and arranged to disperse water through such at least one second sidewall of such at least one second cylindrical tube) are distributed at least adjacent bottom end 124, as shown. Upon reading the teachings of this specification, those with ordinary skill in the art will now understand that, under appropriate circumstances, considering such issues as advances in technology, user preference, etc., other perforation distributions, such as directional, at multiple spike level depths, etc., may suffice.

Preferably, tree waterer 111, particularly top tube 220, comprises one or more holes 292 (at least embodying herein wherein such at least one cylindrical tube comprises at least one remover structured and arranged to assist removal of such at least one cylindrical tube from the soil) structured and arranged to be adjacent the soil surface after tree waterer 111 is installed, as shown. Preferably, holes 292 (at least embodying herein wherein such at least one remover comprises at least one hole in such at least one sidewall structured and arranged to be accessible from adjacent the soil surface in use) are structured and arranged to receive at least one pulling tool, such as, for example, a metal rod, that can be used to pull, or assist removal or extraction, tree waterer 111 up out of the ground. Upon reading the teachings of this specification, those with ordinary skill in the art will now understand that, under appropriate circumstances, considering such issues as advances in technology, user preference, etc., other methods of removing the tree waterer from the soil, such as with a barbed tool that grips the interior of the tube, by digging it up, using a long-term or short-term soluble plastic, etc., may suffice.

FIG. 3 shows a perspective view, illustrating the tree watering system according to the preferred embodiment of FIG. 2, assembled with hidden details shown. Preferably, internal filter 140 (at least embodying herein at least one excluder structured and arranged to exclude soil from such at least one second cylindrical tube) lies adjacent all of perforations 129, as shown (at least embodying herein wherein such at least one excluder is located inside such at least one second cylindrical tube and adjacent such at least one disperser). Upon reading the teachings of this specification, those with ordinary skill in the art will now understand that, under appropriate circumstances, considering such issues as advances in technology, user preference, etc., other arrangements, such as the excluder and disperser functions both being performed by a porous plastic tube, etc., may suffice.

FIG. 4 shows a perspective view illustrating the tree watering system of FIG. 2 assembled. Preferably, slot 127 is preferably cut into sidewall 125 adjacent top end 123, as shown. Preferably, slot 127 extends farther from top end 123 than cap 133 when cap 133 is installed, as shown, so that at least one portion of slot 127 is available to water into tree waterer 111, as shown. Preferably, slot 127 (at least embodying herein at least one receiver, structured and arranged to receive water into such at least one first cylindrical tube, adjacent such at least one first top end) receives at least one drip irrigation line 105 which drips water into tree waterer 111, as shown in FIG. 1.

FIG. 5 shows an exploded perspective view illustrating a tree watering system, comprising a center shaft having a first length, according to a preferred embodiment of the present invention. Preferably, tree waterer 510 comprises three tubes, namely, top tube 520, center tube 519, and bottom tube 518, as shown.

Preferably, top tube 520 and center tube 519 connect together with an outside flush joint, as shown. Preferably, top tube 520 and center tube 519 connect together with unthreaded flush joint 525, as shown.

Preferably, center tube 519 and bottom tube 518 connect together with an outside flush joint, as shown. Preferably, center tube 519 and bottom tube 518 connect together with unthreaded flush joint 545, as shown.

Preferably, top tube 520 comprises male portion 521 of unthreaded flush joint 525, as shown. Preferably, bottom tube 518 comprises male portion 551 of unthreaded flush joint 545, as shown. Preferably, center tube 519 comprises female portion 522 of unthreaded flush joint 525 and female portion 552 of unthreaded flush joint 545, as shown. Preferably, center tube 519 comprises at least one length of pipe. Preferably, bottom tube 518 comprises at least one length of PVC pipe.

Preferably, the length of bottom tube 518 is selected to size tree waterer 510 to the desired depth. Preferably, bottom tube 518 comprises a length of standard PVC pipe cut to the desired length. Upon reading the teachings of this specification, those with ordinary skill in the art will now understand that, under appropriate circumstances, considering such issues as advances in technology, user preference, etc., other length adjustment arrangements, such as cutting the second section to the desired length, etc., may suffice.

FIG. 6 shows an exploded perspective view illustrating tree watering system 510 according to the preferred embodiment of FIG. 5, showing a second length of center tube 519.

FIG. 7 shows an exploded perspective view illustrating the tree watering system according to the preferred embodiment of FIG. 5, showing a third length of the center tube 519 and showing a kit according to a preferred embodiment of the present invention.

FIGS. 5-7 illustrate the modularity of tree watering system 100 and that a user may achieve a selected depth of tree watering system 100 by selecting a particular length of the center tube.

Preferably, kit 700 comprises top tube 520, center tube 519, and bottom tube 518, internal filter 140, cap 133, spike 136, and packaging 705, as shown (at least embodying herein a tree watering kit comprising: at least one first cylindrical tube; at least one second cylindrical tube, at least one disperser structured and arranged to disperse water through such at least one second cylindrical tube; at least one excluder structured and arranged to exclude soil from such at least one second cylindrical tube, wherein such at least one excluder is structured and arranged to be located inside such at least one second cylindrical tube and adjacent such at least one disperser; and at least one packaging structured and arranged to package such at least one first cylindrical tube, such at least one second cylindrical tube, and such at least one excluder for sale). Upon reading the teachings of this specification, those with ordinary skill in the art will now understand that, under appropriate circumstances, considering such issues as advances in technology, user preference, etc., other kit components, such as tools, instructions, fertilizers and/or other additives to place in the tree waterer for dissolution, a hammer, a remover tool, fewer components where the taper is integral with the tube, fewer components where the tube has one or two total sections, more components where the tube has four or more sections, etc., may suffice.

Figure 8:
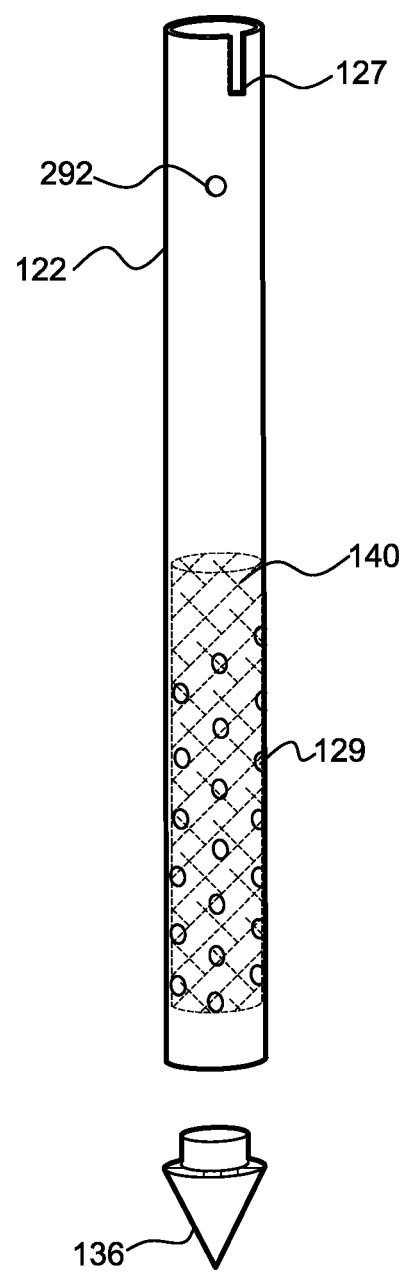
FIG. 8 shows an exploded perspective view illustrating a tree watering system according to another preferred embodiment of the present invention.

FIG. 8 shows an exploded perspective view illustrating a tree watering system according to another preferred embodiment of the present invention. Preferably, tube 122 comprises a single jointless tube, as shown.

Figure 9:
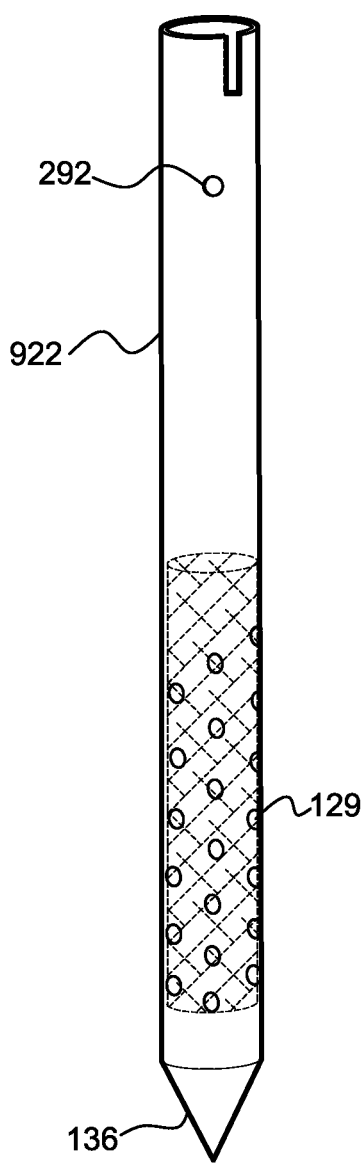
FIG. 9 shows an exploded perspective view illustrating a tree watering system according to yet another preferred embodiment of the present invention.

FIG. 9 shows an exploded perspective view illustrating a tree watering system according to yet another preferred embodiment of the present invention. Preferably, tree waterer 110 comprises tree waterer 910 (at least embodying herein injector means for injecting water into the soil, wherein such injector means comprises tube means for containing water, receiver means for receiving water into such tube means and disperser means for dispersing water from such tube means; and at least embodying herein soil displacer means for displacing the soil, wherein such soil displacer means comprises reinforcer means for reinforcing such injector means against impact forces adjacent such receiver means, shaper means for shaping such tube means into at least one right cylinder, and taper means for tapering such linear extender means into exactly one conical point; and at least embodying herein wherein such injector means comprises such soil displacer means), as shown. Preferably, tree waterer 910 comprises tube 922, as shown. Preferably, tube 922 and taper 136 comprise a single jointless assembly, as shown. Preferably, tube 922 is manufactured by molding tube 922 and then making perforations 129. In a preferred alternate embodiment, tube 922 is manufactured by molding tube 922 with perforations 129 in a single step.

FIG. 10 an exploded perspective view illustrating a tree watering system according to another preferred embodiment of the present invention. Preferably, tree waterer 110 comprises tree waterer 1010, as shown. Preferably, tree waterer 1010 comprises cap 1015, first shaft 1020, and second shaft 1025, ending in spike 1030, as shown. Preferably, first shaft 1020 comprises a variety of lengths as described, for example, in FIGS. 5-7. Preferably, first shaft 1020 is constructed so that first shaft fits onto second shaft 1025, as shown. Preferably, second shaft 1025 comprises shelf 1035 and male portion 1040, as shown. Preferably, first shaft 1020 comprises female portion 1045, as shown. Preferably, male portion 1040 is inserted into female portion 1045 to assemble tree waterer 1010, as shown (see FIG. 11). As shown in FIG. 11, the bottom end of first shaft 1020 rests on shelf 1035. Preferably, first shaft 1020 comprises slit 1017 structured and arranged to receive a drip irrigation line.

Preferably, second shaft 1025 comprises first taper 1050 and second taper 1055, as shown. Preferably, first taper 1050 narrows second shaft 1025 to a diameter smaller than that of the first shaft, as shown. Preferably, second taper 1055 narrows second shaft 1025 to end in spike 1030, as shown.

Preferably, first shaft 1020 comprises a diameter of about 1¼ inches. Preferably, second shaft 1025 comprises a diameter of about 1 inch.

Preferably, cap 1015 fits over the exterior of first shaft 1020, as shown. Preferably, cap 1015 is secured to the top of first shaft 1020 with a sufficiently tight fit so that cap 1015 will not be easily removed from first shaft 1020. Preferably, cap 1015 comprises slit 1018 structured and arranged to permit insertion and removal of tubing, or a drip irrigation line, into, for example, first shaft 1025 so that the root zone of a tree may receive water as describe herein. Preferably, cap 1015 is about 1¾ inches in height. Preferably, cap 1015 comprises an outer diameter of about 1½ inches. Preferably, cap 1015 comprises a domed top, as shown.

Preferably, cap 1015 comprises a substance that protects from the effect of ultraviolet radiation.

Preferably second shaft 1025 comprises perforations, as described above, for the release of fluid, as shown. Preferably, second shaft comprises excluder 240 (fabric 242) placed within second shaft 1025 to prevent blockage of perforations in second shaft 1025, as shown.

FIG. 11 shows a perspective view illustrating the tree watering system of FIG. 10 in an assembled configuration. Preferably, slit 1017 of cap 1015 and slit 1018 of first shaft 1020 are aligned, as shown, to receive a drip irrigation line.

FIG. 12 shows a plan view of the underside of a cap of the tree watering system of FIG. 10. Preferably, cap 1015 comprises reinforcing assembly 1103, as shown. Reinforcing assembly 1103 preferably comprises a plurality of struts 1105 extending radially from central axis 1110, preferably hollow, (the central axis is the axis parallel to the outer edge of cap 1015), as shown. Preferably, cap 1015 comprises 8 struts arranged around central axis 1110, as shown. Preferably, the angle between each strut is about 45 degrees, as shown. Preferably, between each strut 1105 is space 1115, as shown. Such an arrangement provides a sufficiently strong reinforced cap while balancing manufacturing considerations, such as drying time of plastic. Preferably, cap 1015 further comprises slit 1018 for passage of a drip irrigation line inserted into tree watering system.

FIG. 13 shows a perspective view of the cap of FIG. 12. Preferably, cap 1015 comprises reinforcing assembly 1103, as shown. Preferably, reinforcing assembly 1103 begins about a ¾ inch distance from bottom end 1016 of cap 1015, as shown. Such distance permits cap 1015 to fit over first shaft 1020, a cylindrical tube, with a sufficient fit so that cap 1015 does not slip off when force is applied to cap 1015, as shown. Preferably, cap 1015 further comprises slit 1018 for passage of a drip irrigation line inserted into tree watering system.

FIG. 14 shows a cross-sectional view of the section 14-14 illustrating the cap of the tree watering system of FIG. 10. Preferably cap 1015 comprises struts 1105, as shown. The preferred arrangement of cap 1015 provides added reinforcement so that, when the tree watering system is pounded into the ground with, for example, a sledgehammer, the cap and tree watering system will not crack or bend.

FIG. 15 shows a cross-sectional view through the section 15-15 illustrating the reinforced spike of the tree watering system of FIG. 10. Preferably, spike 1030 is reinforced, as shown. Preferably, sidewall 1300 of spike 1030 provides a reinforced spike so that the tree watering system may be driven into the ground without cracking or bending spike 1030.

FIG. 16 shows a plan view illustrating an alternate embodiment of a reinforced spike of the tree watering system of FIG. 10. Preferably, spike 1030 comprises struts 1400 radially extending from central axis 1415 of spike 1030, as shown.

Preferably, 6 struts 1400 extend radially from central axis 1415, as shown. Preferably, the angle between each strut is about 60 degrees, as shown. Preferably, a space, shown as space 1420, is between each strut 1400, as shown. Such an arrangement provides a sufficiently strong reinforced spike while balancing manufacturing considerations, such as drying time.

FIG. 17 shows an exploded perspective view illustrating a tree watering system according to yet another preferred embodiment of the present invention. Preferably, tree waterer 110 comprises tree waterer 1700, as shown. Preferably, tree waterer 1700 comprises cap 1710, first shaft 1720 (a cylindrical tube) and second shaft 1725 (also a cylindrical tube), ending in spike 1790, as shown. Preferably, first shaft 1720 comprises a variety of lengths as described, for example, in FIGS. 5-7. Preferably, first shaft 1720 is constructed so that first shaft fits onto second shaft 1725, as shown. Preferably, second shaft 1725 comprises shelf 1735 and male portion 1737, as shown. Preferably, first shaft 1720 comprises female portion 1739, as shown. Preferably, male portion 1737 is inserted into female portion 1739 to assemble tree waterer 1700, as shown (see FIG. 18). As shown in FIG. 16, the bottom end of first shaft 1720 rests on shelf 1735.

Preferably, first shaft 1720 comprises slit 1715, as shown. Preferably slit 1715 comprises distance A which extends a length about 1½ inches down the side of first shaft 1720 beginning at the top of first shaft 1720, as shown. Preferably, first shaft 1720 comprises two slits 1715 on opposite sides of first shaft 1720. When cap 1710 is installed on first shaft 1720, adequate space for a drip irrigation line through slit 1715 is available, as shown in FIG. 18.

Preferably, first shaft 1720 comprises hole 1792, as shown. Holes 1792 are structured and arranged to receive at least one pulling tool, such as, for example, a metal rod, that can be used to pull the tree watering system up out of the ground. Preferably, hole 1792 is located a distance B from top of first shaft 1720, as show. Preferably, distance B is about 2 inches.

FIG. 18 shows a perspective view illustrating the tree watering system of FIG. 17 in an assembled configuration. In an assembled configuration, cap 1710 fits atop first shaft 1720, as shown. Preferably, slit 1715 for a drip irrigation line, is exposed when cap 1710 is installed, as shown.

FIG. 19 shows a plan view of the underside of a cap of the tree watering system of FIG. 17. Preferably, cap 1710 comprises reinforcing assembly 1706, as shown. Reinforcing assembly 1706 preferably comprises a plurality of struts 1711 extending radially from central axis 1713, preferably hollow, (central axis 1713 is the axis parallel to the outer edge of cap 1710), as shown. Preferably, cap 1710 comprises 8 struts 1711 arranged around central axis 1713, as shown. Preferably, the angle between each strut 1711 is about 45 degrees, as shown. Preferably, between each strut 1711 is space 1716, as shown. Such an arrangement provides a sufficiently strong reinforced cap while balancing manufacturing considerations, such as drying time. Upon reading the teachings of this specification, those with ordinary skill in the art will now understand that, under appropriate circumstances, considering such issues as desired reinforcement, development of stronger materials, desired durability, etc., other reinforcement assembly arrangements, such as completely solid reinforcement, more than 8 reinforcing struts, other than radially arranged struts, etc., may suffice.

FIG. 20 shows a perspective view of the cap of FIG. 19. Preferably, cap 1710 comprises reinforcing assembly 1706, as shown. Preferably, reinforcing assembly 1706 begins about a ¾ inch distance from bottom end 1709 of cap 1710, as shown. Such distance permits cap 1710 to fit over first shaft 1720 with a sufficient fit so that cap 1710 does not slip off when force is applied to cap 1710, as shown. Upon reading the teachings of this specification, those with ordinary skill in the art will now understand that, under appropriate circumstances, considering such issues as desired use, advances in material development, etc. other distances from bottom end, such as about 1 inch, about ½ inch, etc., may suffice.

FIG. 21 shows a cross-sectional view of the cap of the tree watering system of FIG. 17 through the section 21-21. As shown, cap 1710 comprises struts 1711, as shown. The preferred arrangement of cap 1710 provides added reinforcement so that, when tree watering system is pounded into the ground with, for example, a sledgehammer, the cap and the tree watering system will not crack or bend.

FIG. 22 shows a cross-sectional view of the section 22-22 illustrating the reinforced spike of the tree watering system of FIG. 17. Preferably, spike 1790 is reinforced, as shown. Preferably, sidewall 1780 of spike 1790 is solid, as shown, so that the tree watering system may be driven into the ground without cracking or bending spike 1790.

FIG. 23 shows a top plan view illustrating an alternate embodiment of the reinforced spike of the tree watering system of FIG. 17. Preferably, spike 1790 is reinforced with struts 1791 radially extending from central axis 1793 of spike, as shown. Preferably, 6 struts extend radially from central axis 1793, as shown. Preferably, the angle between each strut is about 60 degrees, as shown. Preferably, a space, shown as space 1796, is between each strut 1791, as shown. Such an arrangement provides a sufficiently strong reinforced spike while balancing manufacturing considerations, such as drying time.

Figure 24:
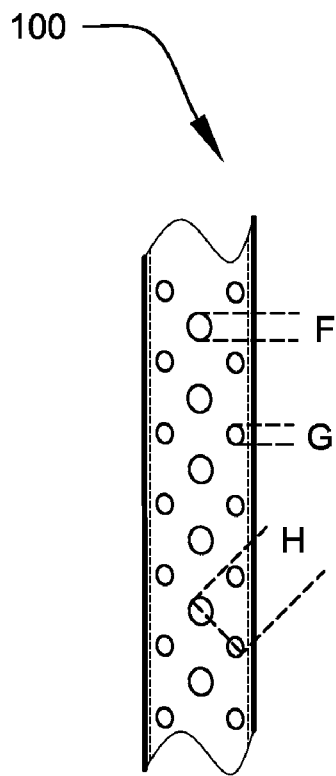
FIG. 24 shows a partial perspective view illustrating a preferred perforation arrangement of a tree watering system according to a preferred embodiment of the present invention.

FIG. 24 shows a partial perspective view illustrating a preferred perforation arrangement of a tree watering system according to a preferred embodiment of the present invention. Preferably, on opposite sides of the second shaft, an alternately preferred hole pattern, as shown, is used. Preferably, a central column of larger holes (relative to the smaller holes, as shown) is used, as shown. Preferably, each larger hole comprises a diameter F, as shown. Preferably, diameter F is about ¼ inch. Preferably, around each larger hole, in an X-like configuration, are preferably four smaller holes (relative to larger holes, as shown). Preferably, each smaller hole comprises a diameter G, as shown. Preferably diameter G is about ⅛ inch. Preferably, the distance from the far end of a larger hole to the far end of a smaller hole is shown as distance H. Preferably, distance H comprises a distance of about ¾ inch. Such an arrangement provides regularly spaced holes to allow for a pattern of fluid dispersion out of the second shaft.

Figure 25:
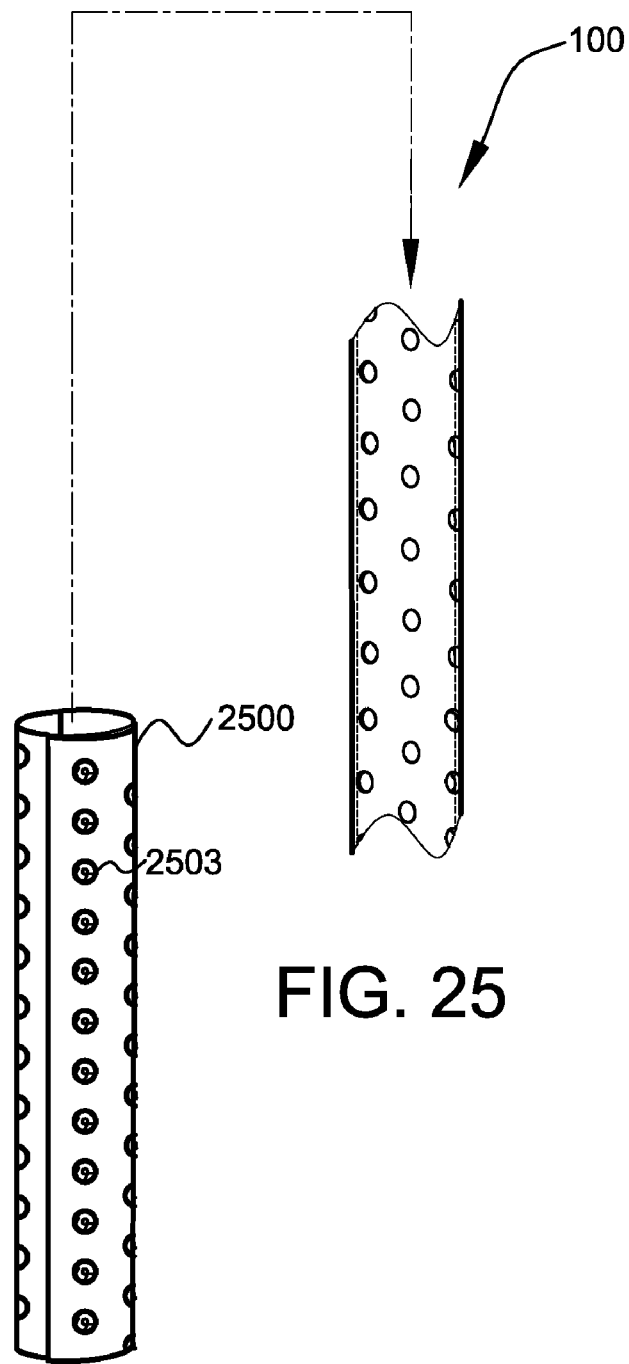
FIG. 25 shows a perspective view illustrating the use of an herbicide with a tree watering system according to a preferred embodiment of the present invention.

FIG. 25 shows a perspective view illustrating the use of an herbicide with tree watering system 100 according to a preferred embodiment of the present invention. Preferably, an herbicide is incorporated into a piece of fabric, fabric 2500, which is placed within tree watering system 100, as shown. In addition to the watering of the roots, the growth of the roots may be controlled with fabric 2500 comprising an herbicide.

Preferably, fabric 2500 comprises a nonwoven, polypropylene geotextile fabric, preferably BioBarrier® manufactured by Reemay, Inc., of Old Hickory, Tenn. Preferably, fabric 2500 comprises at least one attached nodule 2503, as shown. Preferably, such attached nodules 2503 comprise an herbicide, preferably, the herbicide Trifluralin, sold as a liquid under the product name Treflan E.C. made available by Dow AgroSciences Canada Inc. of Calgary, Alberta. Trifluralin works by preventing root spike cells from dividing and does not affect the plant systemically. Trifluralin is preferred because it retains potency for years and typically does not require replacement. Trifluralin is also preferred because it is essentially nontoxic, having an EPA toxicity rating of class IV and an acute oral LD50 in rats greater than 10,000 mg/kg, which is slightly more toxic than sugar but less toxic than salt. Trifluralin has an extremely low water solubility of 0.3 ppm, making it unlikely to leach into groundwater. Trifluralin also tightly attaches to soil, so it doesn't tend to migrate. Trifluralin decomposes in six months or less, so it doesn't persist in the ground.

Preferably, fabric 2500 comprising herbicide is rolled and inserted into the bottom of the second shaft adjacent internal filter 140. BioBarrier® comprising Trifluralin is also preferred because the attached nodules slowly release Trifluralin, creating a zone where root growth is inhibited. Further, BioBarrier® is porous to allow air, nutrients and water through it so that soil hydrology can continue to be healthy. BioBarrier® is also preferred because it is easy to install and will be effective at least 15 years or more depending on soil temperature and composition.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A tree watering system, relating to dispersing at least water, from at least one water source, into soil, beneath a surface of such soil, to a root zone of a tree, said tree watering system comprising:
    a) at least one cylindrical tube structured and arranged to permit the flow of at least water from the at least one water source to the root zone of a tree, said at least one cylindrical tube comprising
        i) at least one top end,
        ii) at least one bottom end, and
        iii) at least one sidewall;
    b) wherein said at least one cylindrical tube is structured and arranged to receive at least water from said at least one water source into said at least one cylindrical tube;
    c) wherein said at least one cylindrical tube is structured and arranged to disperse at least water through said at least one sidewall of said at least one cylindrical tube; and
    d) wherein depth placement beneath the soil of said at least one cylindrical tube is selectable;
    e) at least one cap structured and arranged to cap said at least one cylindrical tube at said at least one top end;
    f) wherein said at least one cap is structurally reinforced to permit pounding said tree watering system into soil without breaking said tree watering system with said at least one cap installed on said at least one top end; and
    g) at least one spike connected to said at least one cylindrical tube at said at least one bottom end; and
    h) at least one excluder structured and arranged to exclude soil from the interior of said at least one cylindrical tube;
    i) wherein said at least one excluder is located adjacent an internal wall of said at least one cylindrical tube;
    j) wherein said at least one sidewall comprises at least one hole not covered by said at least one cap;
    k) wherein said at least one hole is structured and arranged to assist removal of said at least one cylindrical tube from the soil, when installed; and
    l) wherein said at least one hole is structured and arranged to be accessible to a user when said at least one top end is substantially adjacent the soil surface.

2. The tree watering system according to claim 1 wherein said at least one cylindrical tube comprises a plurality of modularly attachable cylindrical tubes of various sizes to select said depth placement.

3. The tree watering system according to claim 1 wherein said at least one spike is removably attachable to said at least one bottom end of said at least one cylindrical tube.

4. The tree watering system according to claim 1 wherein said at least one cylindrical tube comprises at least one slot in said at least one sidewall, adjacent said at least one top end of said at least one cylindrical tube, to receive at least one water source tubing.

5. The tree watering system according to claim 1 wherein said at least one excluder comprises at least one fabric.

6. The tree watering system according to claim 1 wherein said at least one top end of said at least one cylindrical tube is structured and arranged to be positioned above the soil surface yet below the blades of a lawnmower.

7. The tree watering system according to claim 6 wherein said at least one top end of said at least one cylindrical tube is adapted to be positioned less than about one inch above the soil surface.

8. The tree watering system according to claim 1 further comprising at least one herbicide to control growth of nearby roots.

9. The tree watering system according to claim 1 wherein said at least one cylindrical tube comprises a plurality of perforations structured and arranged to assist dispersal of at least water from said at least one cylindrical tube.

10. A plant watering system, relating to dispersing at least one aqueous liquid, from at least one aqueous liquid source, into soil comprising a root zone of a plant situate beneath a surface of such soil, said plant watering system comprising:
 a) at least one cylindrical tube structured and arranged to permit the flow of the at least one aqueous liquid from the at least one aqueous liquid source to the root zone of the plant, at least one cylindrical tube comprising
  i) at least one top end portion,
  ii) at least one bottom end portion, and
  iii) at least one sidewall extending therebetween;
 b) wherein said at least one first cylindrical tube further comprises
  i) at least one first tube segment comprising at least one first tube-segment length,
  ii) at least one second tube segment comprising at least one second tube-segment length, and
  iii) at least one coupler structured and arranged to couple said at least one first tube segment with said at least one second tube segment,
  iv) wherein said at least one first tube segment comprises said at least one bottom end portion, and
  v) wherein said at least one second tube segment comprises said at least one top end portion; and
 c) located within said at least one sidewall
  i) a plurality of passages, each one structured and arranged to pass the at least one aqueous liquid from within said at least one cylindrical tube through said at least one sidewall, and
  ii) at least one material excluder structured and arranged to exclude non-liquid material from passing through said plurality of passages; and
 d) at least one cap structured and arranged to cap said at said at least one top end portion of said at least one cylindrical tube;
 e) wherein said at least one cap comprises at least one slot structured and arranged to receive at least one liquid-carrying tube providing tube-assisted carrying of the at least one aqueous liquid from the at least one aqueous liquid source;
 f) wherein said at least one cap comprises at least one structural reinforcer structured and arranged to reinforce said at least one cap, against structural failure of at least said at least one cap, during impact by a hammer used to effect penetration of said at least one cylindrical tube through soil;
 g) wherein said at least one top end portion is structured and arranged to receive the at least one aqueous liquid from the at least one aqueous liquid source into said at least one cylindrical tube;
 h) wherein said at least one bottom end portion comprises at least one soil-penetration assister structured and arranged to assist penetration of said at least one cylindrical tube through the soil;
 i) wherein said at least one soil-penetration assister comprises a spike; and
 j) wherein said plurality of passages are structured and arranged to disperse the at least one aqueous liquid along at least a portion of the length of said at least one cylindrical tube extending between said at least one top end portion and said at least one bottom end portion.

\* \* \* \* \*